US009407454B2

(12) United States Patent
Mejia

(10) Patent No.: US 9,407,454 B2
(45) Date of Patent: *Aug. 2, 2016

(54) ANTI-STARVATION AND BOUNCE-REDUCTION MECHANISM FOR A TWO-DIMENSIONAL BUFFERLESS INTERCONNECT

(71) Applicant: Intel Corporation, Santa Clara, CA (US)

(72) Inventor: Andres Mejia, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/605,988

(22) Filed: Jan. 26, 2015

(65) Prior Publication Data

US 2015/0139242 A1  May 21, 2015

Related U.S. Application Data

(63) Continuation of application No. 13/631,944, filed on Sep. 29, 2012, now Pat. No. 8,982,695.

(51) Int. Cl.
| | |
|---|---|
| *H04L 12/43* | (2006.01) |
| *G06F 15/78* | (2006.01) |
| *H04J 3/08* | (2006.01) |
| *H04L 12/42* | (2006.01) |
| *H04L 12/741* | (2013.01) |

(52) U.S. Cl.
CPC ............ *H04L 12/43* (2013.01); *G06F 15/7825* (2013.01); *H04J 3/085* (2013.01); *H04L 12/422* (2013.01); *H04L 45/74* (2013.01); *H04L 2012/421* (2013.01)

(58) Field of Classification Search
CPC ........ H04L 12/43; H04L 12/422; H04L 12/24; H04L 12/42; H04L 45/74; H04L 1/00; G04F 12/00
See application file for complete search history.

(56) References Cited

U.S. PATENT DOCUMENTS

| | | | |
|---|---|---|---|
| 2003/0185229 A1 | 10/2003 | Shachar et al. | |
| 2006/0041715 A1* | 2/2006 | Chrysos | G06F 15/8015 711/110 |
| 2006/0045120 A1* | 3/2006 | Mattina | H04L 12/43 370/460 |
| 2006/0268909 A1 | 11/2006 | Langevin et al. | |
| 2007/0297441 A1 | 12/2007 | Heil et al. | |
| 2008/0267211 A1 | 10/2008 | Gangwal et al. | |
| 2012/0002675 A1 | 1/2012 | Kauschke et al. | |

FOREIGN PATENT DOCUMENTS

WO    2014/051748 A1    4/2014

OTHER PUBLICATIONS

International Preliminary Report on Patentability received for PCT Patent Application No. PCT/US2013/045862, mailed on Apr. 9, 2015, 7 pages.
International Search Report and Written Opinion received for PCT Patent Application No. PCT/US2013/045862, mailed on Nov. 14, 2013, 10 pages.

* cited by examiner

*Primary Examiner* — Anez Ebrahim
(74) *Attorney, Agent, or Firm* — Carrie A Boone PC

(57) ABSTRACT

A slot reservation method is disclosed. The slot reservation method generates slot reservations in two dimensions to address starvation and to reduce bounce of messages transmitted through an interconnect. An interconnect implemented using the slot reservation method is capable of being scaled to larger network-on-chip implementations.

14 Claims, 13 Drawing Sheets flow diagram for bounce reduction in the horizontal ring

… … …

ANTI-STARVATION AND BOUNCE-REDUCTION MECHANISM FOR A TWO-DIMENSIONAL BUFFERLESS INTERCONNECT

TECHNICAL FIELD

This application relates to bufferless interconnects and, more particularly, to mechanisms for addressing starvation and bounce within such interconnects.

BACKGROUND

On-chip network architectures, also known as network-on-chip architectures, are being designed with a large number of agents. Traditionally, these network architectures have emulated off-chip networks, resulting in complex designs that are not scalable.

An interconnect, a type of mesh network, is a simplified design topology that enable large numbers of agents to coexist on-chip, with each agent being able to communicate with another agent. Interconnects are made from combinations of rings, presented in two dimensions, with intelligence embedded at the intersections of the rings.

Unfortunately, the design of such interconnects tends to favor the agents disposed at the periphery of the interconnect over agents located in the center of the interconnect. This design flaw may result in starvation, in which an agent is unable to send a message over the interconnect to another agent, and bounce, in which messages already in the interconnect are unable to reach their destination agent.

Thus, there is a continuing need for a solution to overcome the shortcomings of the prior art.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a slot reservation method is disclosed. The slot reservation method enables agents to generate slot reservations in two dimensions. The slot reservation method addresses starvation and reduces bounce of messages transmitted through an interconnect.

In the following detailed description, reference is made to the accompanying drawings, which show by way of illustration specific embodiments in which the subject matter described herein may be practiced. However, it is to be understood that other embodiments will become apparent to those of ordinary skill in the art upon reading this disclosure. The following detailed description is, therefore, not to be construed in a limiting sense, as the scope of the subject matter is defined by the claims.

Figure 1:
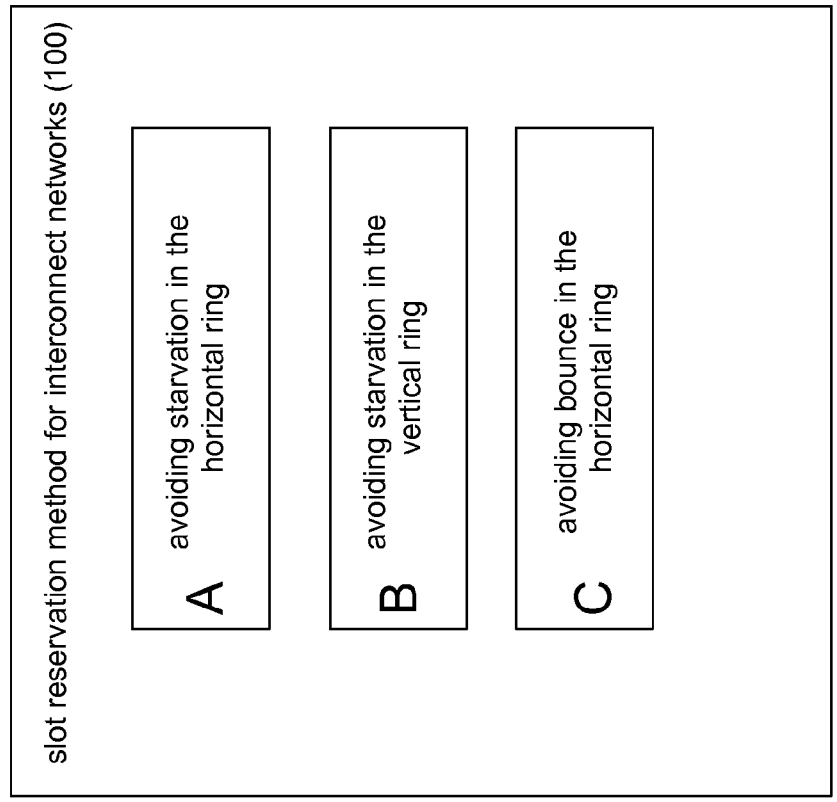
FIG. 1 is a simplified flow diagram of a slot reservation method, according to some embodiments.

FIG. 1 is a simplified block diagram of a slot reservation method 100, according to some embodiments. The slot reservation method 100 is used in an interconnect that connects multiple agents together. The slot reservation method 100 is performed to address any one of three phenomena that may arise in the interconnect: starvation in the horizontal ring (A), starvation in the vertical ring (B), and bounce in the horizontal ring (C). Each of these phenomena cause the interconnect to operate inefficiently, and each is addressed by making a slot reservation, as described below. In some embodiments, message processing in the interconnect is improved using the slot reservation method 100.

Figure 2:
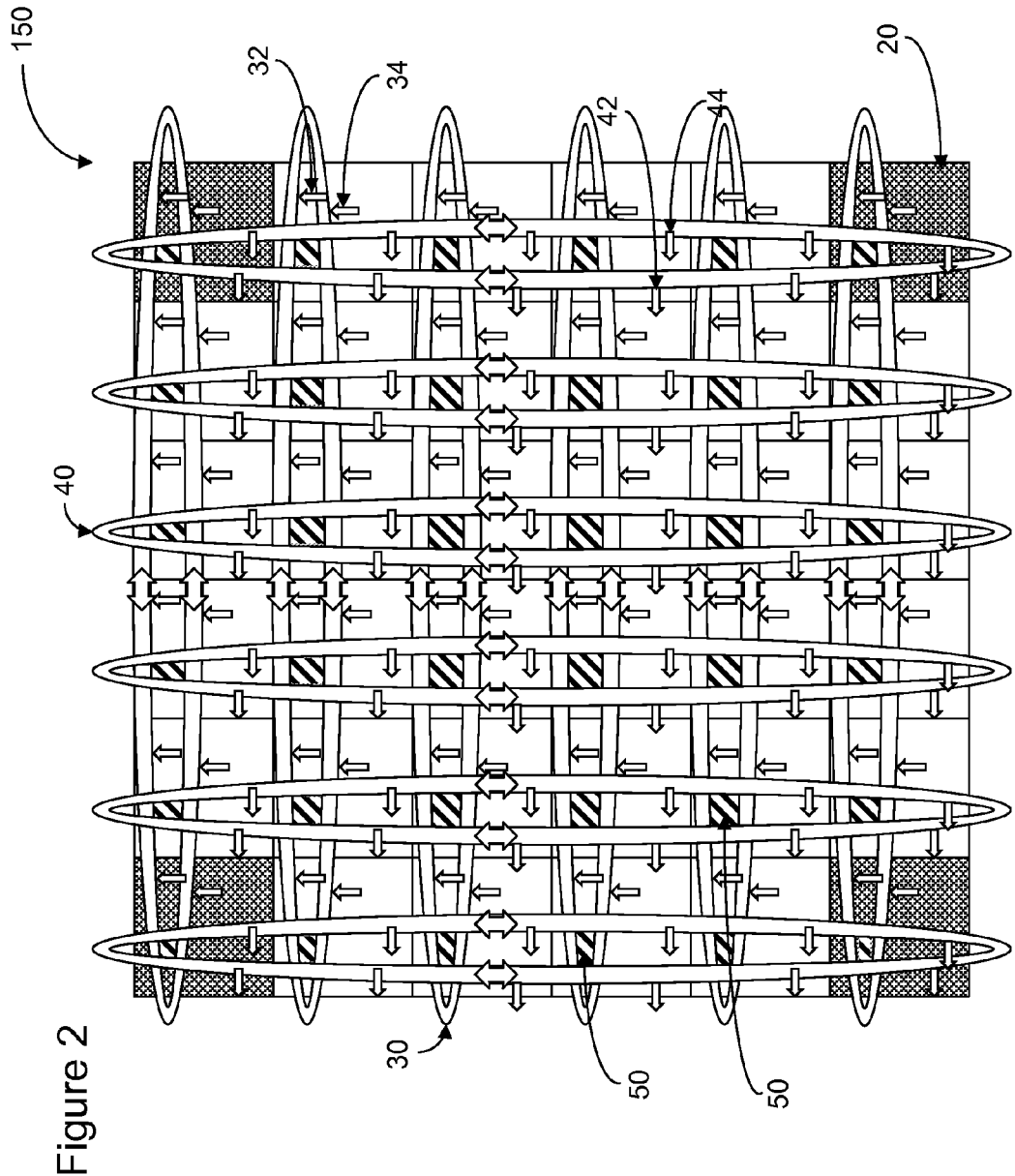
FIG. 2 is a simplified diagram of a 6×6 interconnect supporting up to 72 agents, according to some embodiments.

Before describing the slot reservation method 100 in detail, an introduction to the interconnect is appropriate. FIG. 2 is a simplified diagram of a two-dimensional interconnect 150, according to some embodiments. The example interconnect 150 is a six-by-six topology, supporting the connection of up to 72 agents. Half rings 30 are presented in the horizontal plane while half rings 40 are presented in the vertical plane. The half rings 30, 40 are also known herein as the horizontal rings and vertical rings, respectively.

Tiles 20 disposed beneath the rings 30, 40 denote agent place markers, with each tile supporting two agents. In FIG. 2, the agents are not explicitly depicted, but the ingress of a message from each cache agent and each core agent into the interconnect 150 and their egress from the interconnect are illustrated using arrows. Thus, the arrows 32 and the arrows 34 indicate ingress of a message from a core/cache agent onto the interconnect 150 while the arrows 42 and the arrows 44 indicate egress of a message from the interconnect to the core/cache agent.

Each agent is serviced by a ring stop 50 (diagonal stripes), which is positioned at the intersection between the horizontal ring 30 and the vertical ring 40 for that agent. The ring stop 50 (not to be confused with the ring slots 90, described below) includes the intelligence of the interconnect 150. The ring stop 50 is described in more detail, below.

The interconnect 150 is an extension of ring interconnect designs to a two-dimensional grid topology. The horizontal 30 and vertical 40 rings are interconnected at the cross-points. An agent is simultaneously connected to one of the horizontal rings 30 and one of the vertical rings 40.

Figure 3:
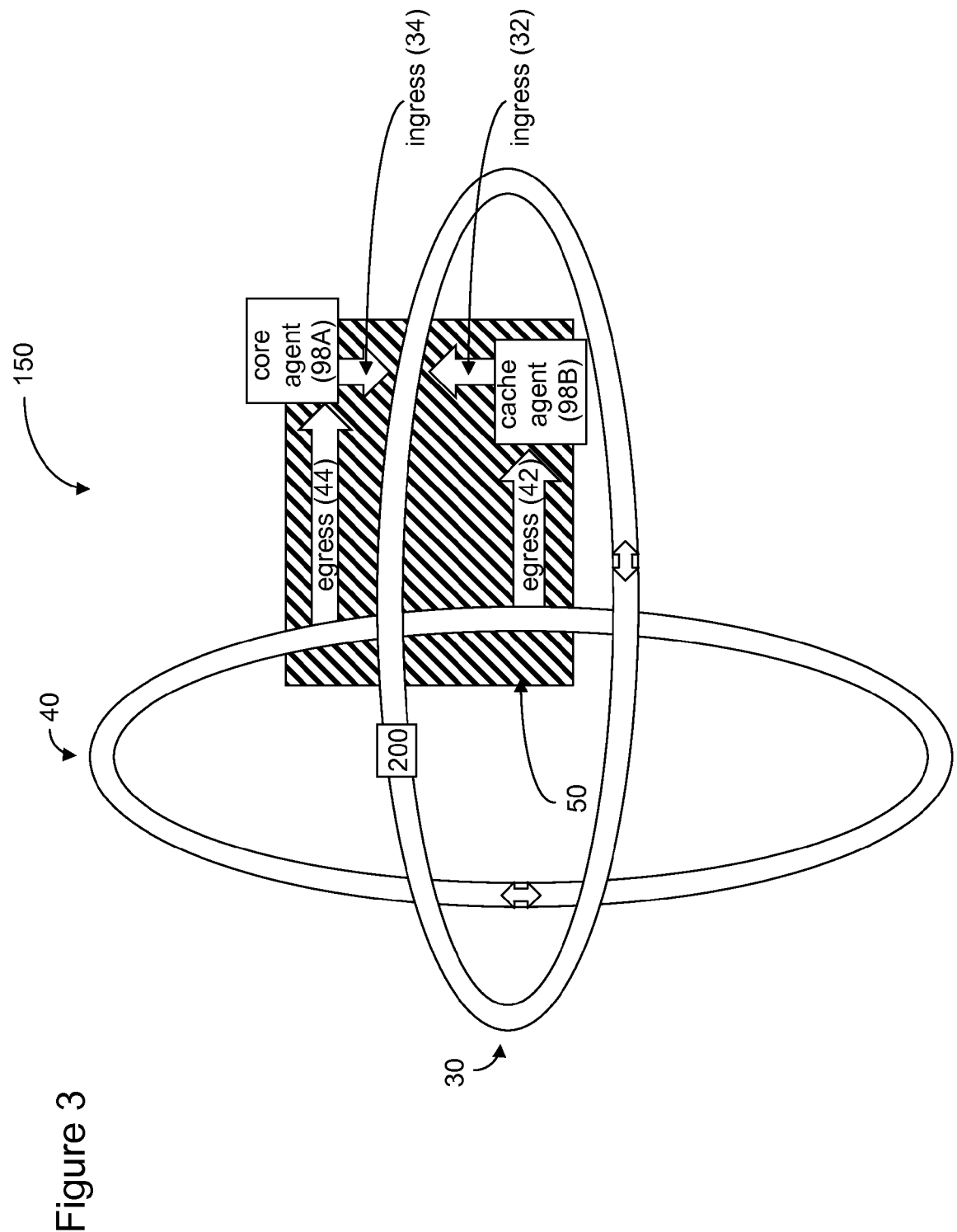
FIG. 3 is a simplified diagram of the interconnect of FIG. 2, showing a single horizontal ring and a single vertical ring intersecting and coupled to a pair of agents, according to some embodiments.

FIG. 3 is a simplified diagram of the interconnect 150, featuring a single horizontal ring 30 and a single vertical ring 40, with the ring stop 50 disposed between the rings. Also shown in FIG. 3 are two agents, a core agent 98A and a cache agent 98B (collectively, "agents 98"). Both agents 98 are connected to both the horizontal and vertical rings. Ingress to the horizontal ring 30 is given by ingress points 32 and 34 and egress from the vertical ring 40 is given by egress points 42 and 44. A flit 200 is traveling along the horizontal ring 30.

Traffic on the interconnect 150 refers to messages being transmitted between two agents 98. The messages are transmitted as multiple flits. A flit, short for flow control digit, is the smallest unit of flow control. Messages are generally made up of multiple flits. A single flit 200 is shown in FIG. 3 entering the interconnect 150 on the horizontal ring 30. The processing of flits 200 on the interconnect 150 in general, as well as by the slot reservation method 100, are described in more detail below.

Figure 4:
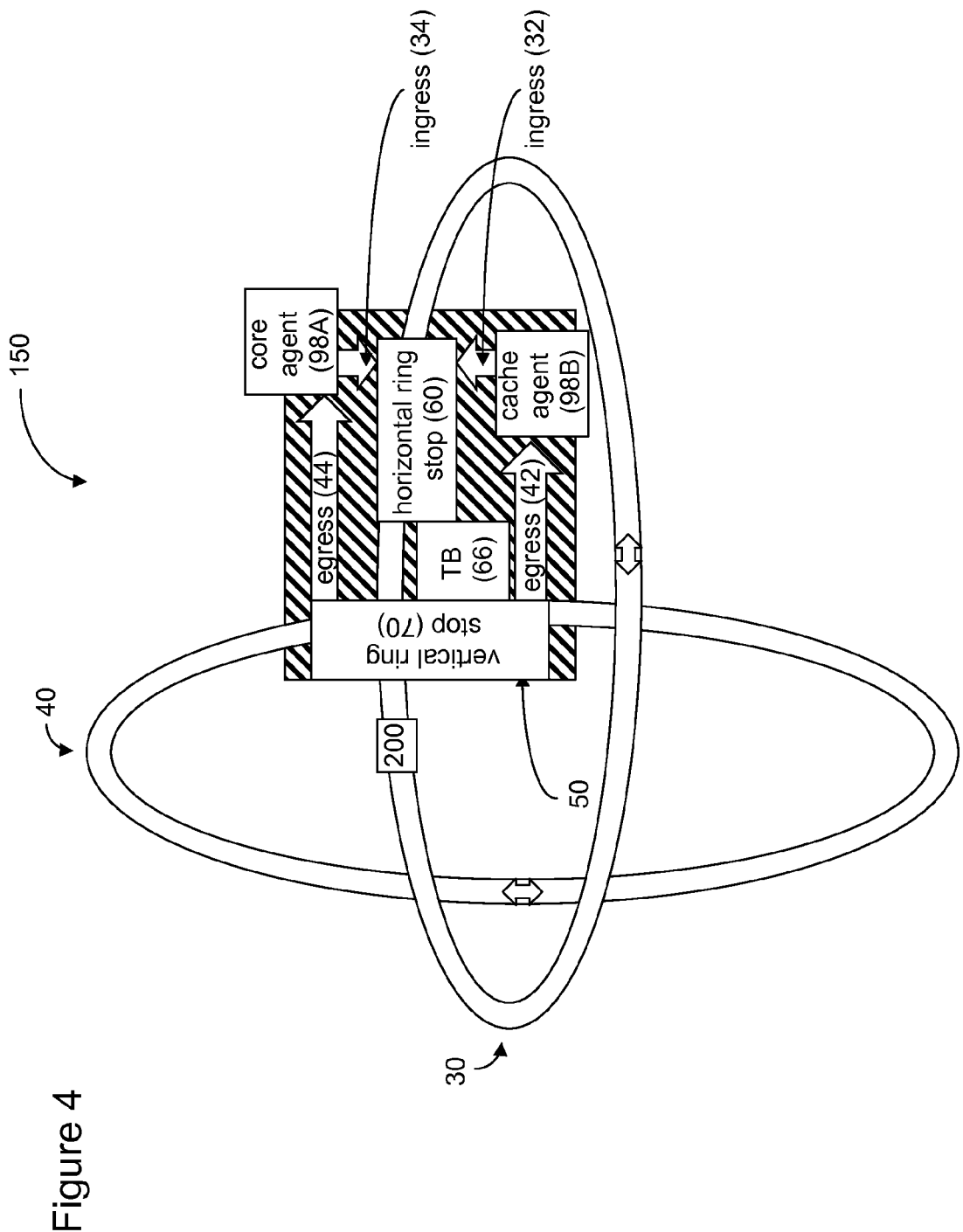
FIG. 4 is the simplified diagram of the interconnect of FIG. 2, showing some of the elements of the ring stop, according to some embodiments.

FIG. 4 is another simplified diagram of the interconnect 150, according to some embodiments. For processing the flits 200 being transmitted between agents, the ring stop 50 includes a horizontal ring stop 60, a vertical ring stop 70, and a transgress buffer (TB) 66. The horizontal ring stop 60 processes flits 200 received from an agent (either agent 98A or agent 98B) intended for another agent on the interconnect 150. The vertical ring stop 70 processes flits 200 received from the horizontal ring 30, and ensures that the flits are sent to the agents by way of the vertical ring 40. The transgress buffer 66, disposed between the horizontal ring stop 60 and the vertical ring stop 70, provides buffering of flits 200 passing between the two ring stops. In other embodiments, flits 200 received from an agent 98 first traverse the vertical ring 40, then are processed by the vertical ring stop 70 before being transferred to the horizontal ring 30. The slot reservation method 100 is not limited to a particular ring topology and operates in multiple interconnect environments.

Figure 5:
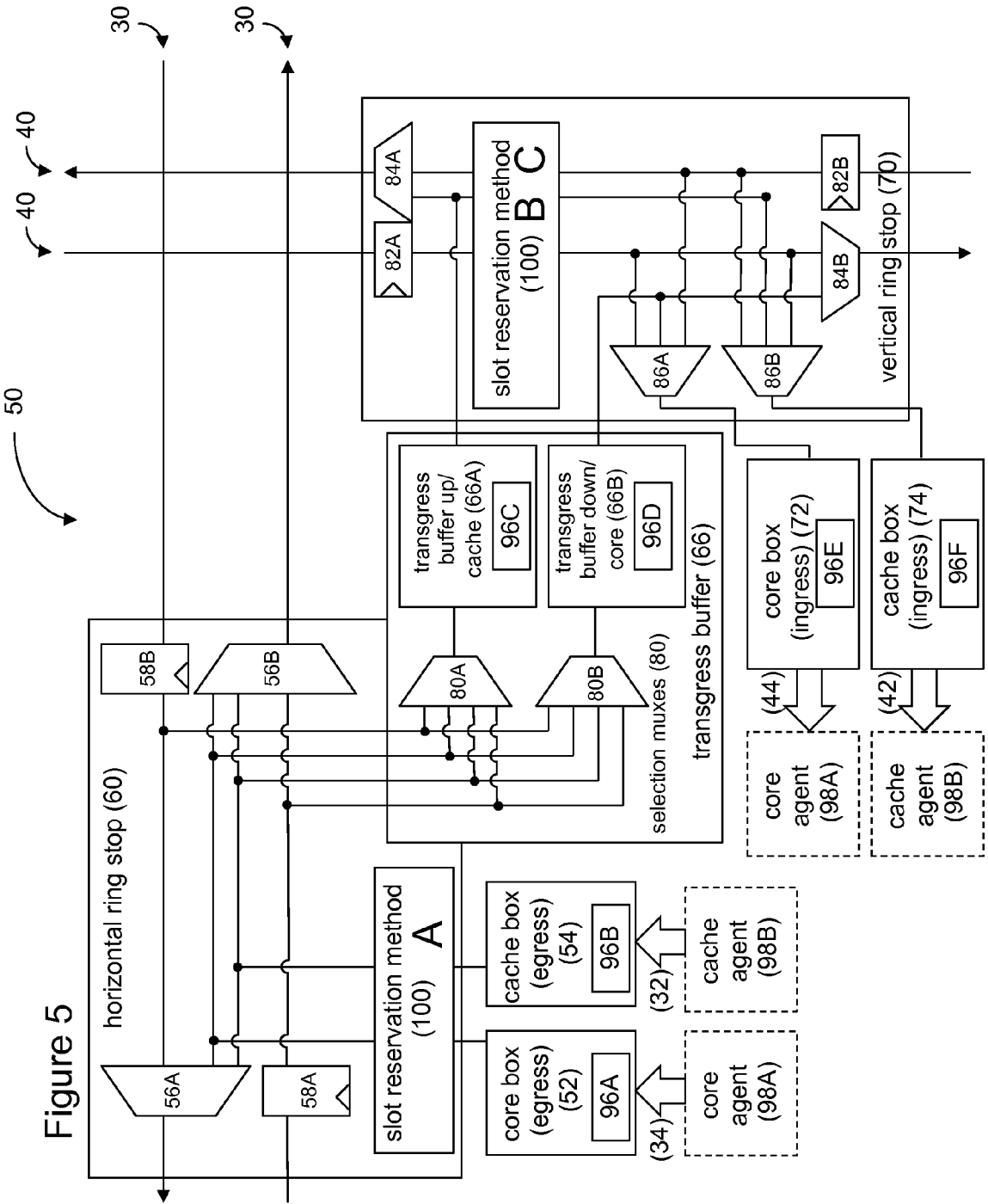
FIG. 5 is a schematic diagram of a ring stop used by the slot reservation method of FIG. 1, according to some embodiments.

FIG. 5 is a detailed schematic diagram of the ring stop 50 in the interconnect 150 (FIGS. 2, 3, and 4), according to some embodiments. The ring stop 50 is used by the slot reservation method 100 of FIG. 1 to avoid two phenomena that occur in the interconnect 150, starvation and bounce. Starvation and bounce are described in more detail below.

The ring stop 50 is the way station for moving flits 200 from the horizontal ring 30 to the vertical ring 40. In addition to the horizontal ring stop 60, the vertical ring stop 70, and the transgress buffer 66 described in FIG. 4, the ring stop 50 includes a cache box (egress) 54, a core box (egress) 52, a core box (ingress) 72, and a cache box (ingress) 74. The core agent 98A connects to the core box 52 to send flits 200 to the interconnect 150 and connects to the core box 72 to receive flits from the interconnect. Similarly, the cache agent 98B connects to the cache box 54 to send flits 200 to the interconnect 150 and connects to the cache box 74 to receive flits from the interconnect. The slot reservation method 100 is disposed within the horizontal and vertical ring stops 60, 70. In some embodiments, the transgress buffer 66 has its own buffers or queues, a buffer 96C in the transgress buffer up/cache 66A and a buffer 96D in the transgress buffer down/core 66B.

The core box 52 and the cache box 54 initiate the transaction on the interconnect 150. The core box 52 receives flits 200 from the core agent 98A and sends the flits through the interconnect 150 via the horizontal ring 30. Similarly, the cache box 54 receives flits 200 from the cache agent 98B and sends the flits through the interconnect 150 via the horizontal ring 30. The core box 52 and the cache box 54 are connected to the horizontal ring 30 by way of multiplexers 56A and 56B (collectively, "multiplexers 56").

The core box 72 and the cache box 74 terminate the transaction on the interconnect 150. The core box 72 and the cache box 74 receive flits 200 from the vertical ring stop 70. The core box 72 and the cache box 74 are connected to the vertical ring 40 by way of multiplexers 86A and 86B (collectively, "multiplexers 86").

On the horizontal ring 30, flits 200 for a given message travel in a single direction, either counter-clockwise or clockwise. An agent 98 may send a message in a counter-clockwise direction, then send a second message in a clockwise direction, with the direction being governed by the shortest distance between the transmitting agent and the receiving agent.

Similarly, flits 200 traveling across the vertical ring 40 may travel in a counter-clockwise direction or in a clockwise direction. However, the vertical ring 40 has polarity, which changes the coupling of the agents to the vertical ring during each time period. During a first time period, the core box 72 is connected to the vertical ring 40 going in a first direction (e.g., counter-clockwise) while the cache box 74 is connected to the vertical ring going in the opposite direction (e.g., clockwise). During the next succeeding time period, the core box 72 is connected to the vertical ring 40 going in the opposite direction (clockwise), while the cache box 74 is connected to the vertical ring going in the first direction (counter-clockwise). Thus, while messages may be sent in both directions, flits 200 for a given message are transmitted in a particular direction during every other time period.

The transgress buffer 66 provides buffering for flits 200 coming from the horizontal ring 30, and moves the flits 200 to the vertical ring 40. In some embodiments, the transgress buffer 66 further includes a transgress buffer up/cache 66A, a transgress buffer down/core 66B, and selection multiplexers 80A and 80B (collectively, "selection multiplexers 80"). The selection multiplexers 80 select the destination of incoming flits 200, whether counter-clockwise or clockwise, core agent or cache agent. There are multiple possible implementations of the transgress buffer 66 within the ring stop 50, depending on the buffer organization and connectivity, with trade-offs being made between the desired throughput and the implementation cost, in some embodiments.

Within the ring stop 50, the horizontal ring stop 60 is composed of two latches 58A and 58B (collectively, "latches 58"), one in each direction, that temporarily store flits 200 traveling across the horizontal ring 30. The multiplexers 56 select the flit 200 that departs from the horizontal ring stop 60 at every processing cycle.

A higher priority for the multiplexers 56 is given to flits 200 that continue across the horizontal ring 30 than for flits that are to be injected in to the horizontal ring (flits that arrive at the horizontal ring stop through the agent egress queue 52/54). Thus, where a flit 200 is traveling across the horizontal ring 30, time period by time period, until it reaches the ring stop associated with the intended destination agent, the flit will be processed before newly entering flits are processed.

The two selection multiplexers 80 of the transgress buffer 66 filter flits 200 according to their intended destination on the vertical ring 40. For example, the selection multiplexer 80A will send a flit 200 going counter-clockwise along the vertical ring 40 or destined to the local cache box to the corresponding transgress buffer (96C) while the multiplexer 80B sends a flit 200 going clockwise along the vertical ring or destined to the local core box to the corresponding transgress buffer (96D).

The vertical ring stop 70 is composed of two latches 82A and 82B (collectively, "latches 82") that temporarily store flits 200 traveling across the vertical ring 40. The vertical ring stop 70 also includes two multiplexers 84A and 84B (collectively, "multiplexers 84") that select flits 200 traveling to the ingress ports 72, 74 of the agents 98. The multiplexers 86 of the vertical ring stop 70 select the flit 200 that is injected into the agent ingress queue at every processing cycle. A higher priority for the multiplexers 86 is given to flits 200 that are already traveling along the vertical ring 70 than for flits that are transferred to the ring from the transgress buffer 66.

The core box 52 includes a buffer 96A and the cache box 54 includes a buffer 96B, for storing flits 200 that make up a message. Similarly, the transgress buffer up 66A includes a buffer 96C, and the transgress buffer down 66B includes a buffer 96D. Finally, the core box 72 includes a buffer 96E and the cache box 74 includes a buffer 96F, for storing received flits 200 (collectively, "buffers 96"). These buffers 96 are used to store the flits 200 that make up the message in their intended transmission order.

The horizontal ring stop 60 receives the flit 200 from the horizontal ring 30 or from the agent egress queue 52/54. If the flit requires a change of dimension or it has arrived to its intended destination, the flit 200 is then transferred through the multiplexers 80 and is stored according to its destination. The transgress buffer 66A stores flits going in a first direction (e.g., counter-clockwise) or intended for a first type of agent (e.g., cache agent). The transgress buffer 66B store flits going in a second direction (e.g., clockwise) or intended for a second type of agent (e.g., core agent).

In either case, the transgress buffer 66 transfers the flit 200 to the vertical ring stop 70. Where starvation occurs on the horizontal ring 30 (situation A), the slot reservation method 100 is executed. Where starvation occurs on the vertical ring 40 (situation B), the slot reservation method 100 may also be executed. Finally, where bounce occurs on the horizontal ring 30 (situation C), the slot reservation method 100 is also executed. In any of these circumstances, by reserving a slot on the appropriate ring, the throughput of message processing is improved, in some embodiments.

Returning to FIG. 4, the ingress arrows 32 and 34 are so named because they "ingress" from the cache and core agents 98, respectively, to the horizontal ring 30. Similarly, the egress arrows 42 and 44 "egress" from the vertical ring 70 to the cache and core agents 98, respectively. The arrows 32, 34, 42, and 44 from FIG. 4 are indicated as well in FIG. 5. In contrast, the core box 52 and cache box 54 are denoted as "egress" because flits from the core and cache agents 98 leave the agents and enter the horizontal ring 30.

In the interconnect 150, the egress ports 52, 54 of the agents 98 are connected to the horizontal ring stop 60, allowing traffic that needs to be routed only horizontally to be injected to the interconnect 150 through the horizontal ring 30. Traffic that needs to be routed only vertically gets injected to the interconnect 150 through the vertical ring 40 after passing across the transgress buffer 66 located at the source ring stop. Traffic that needs to be routed horizontally, then vertically gets injected to the interconnect 150, first through the horizontal ring 30, and then is transferred to the vertical ring 40 through the transgress buffer 66 located at the ring stop 50.

Ingress ports 72, 74 of the agents 98 are connected to the vertical ring 40 through the vertical ring stop 70, enabling traffic that is routed vertically to leave the interconnect 150 through the vertical ring 40. Every horizontal ring stop 60 is also connected to the ingress ports of the agents 98. Traffic that is not required to be routed across the vertical ring 40 leaves the interconnect 150 using this connection. In some embodiments, a higher priority is given to traffic traveling across the vertical ring 40 than to traffic traveling across the horizontal ring 30.

The horizontal ring 30 and the vertical ring 40 are actually half-rings, which is different than a bidirectional ring. In the half-ring, a unidirectional ring is used in each direction, but each ring stop 50 connects to both directions (left and right for the horizontal ring 30, up and down for the vertical ring 40) of the ring.

An agent 98 chooses the direction of the ring in which to inject the flit 200, based on the minimum travel distance to the destination agent 98 on the ring. The wrap-around connections on the half-ring connect the two unidirectional half-rings (left/right and up/down) to form a bidirectional ring. The wrap-around connections on the half-ring get used only when a destination agent (or ring stop 50, in the case of a horizontal ring) cannot accept a flit 200, such that the flit ends up getting bounced on the ring. For the interconnect 150, the routing policy used is horizontal first, so the flit 200 is routed from the source agent 98 on the horizontal ring 30 to the destination column by way of the ring slot. Then, the flit 200 is routed onto the vertical ring 40 (if required), and then proceeds to the actual destination agent 98.

While the representation of the interconnect 150 may imply a symmetry between core and cache agents, in practical situations, the interconnect 150 may be populated with many more core agents than cache agents. Nevertheless, the design of the interconnect 150 is meant to facilitate communication between any two connected agents 98, whether they be core agents or cache agents. While the interconnect 150 is successful in this goal, some aspects of the design favor some agents over others. Recall from FIG. 2 that the four corner tiles 20, each representing two agents 90, are shaded. In the processing of messages between agents, the agents 98 occupying these border tiles 20 are favored over the other agents located at the center of the interconnect 150.

There are two agents connected per tile (ring stop) each agent has two ports (queues), one is referred to as ingress to receive flits from the interconnect 150 and the other referred to as egress to deliver flits into the interconnect. For simplicity we call one of the agents cache (with associated cache egress queue 54 and associated cache ingress queue 74) and the other agent core (with associated core egress queue 52 and associated core ingress queue 72).

Figure 6A:
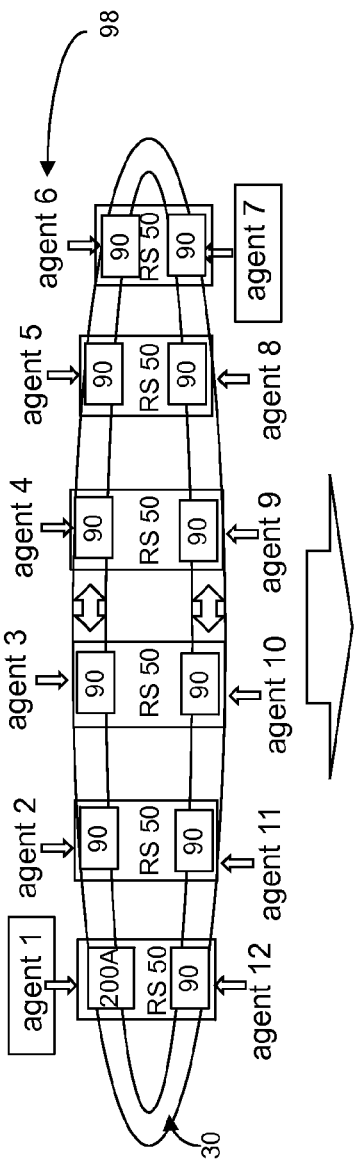
FIGS. 6A-6C are simplified diagrams illustrating how peripheral agents are favored over middle agents in the interconnect of FIG. 2, according to some embodiments.
Figure 6B:
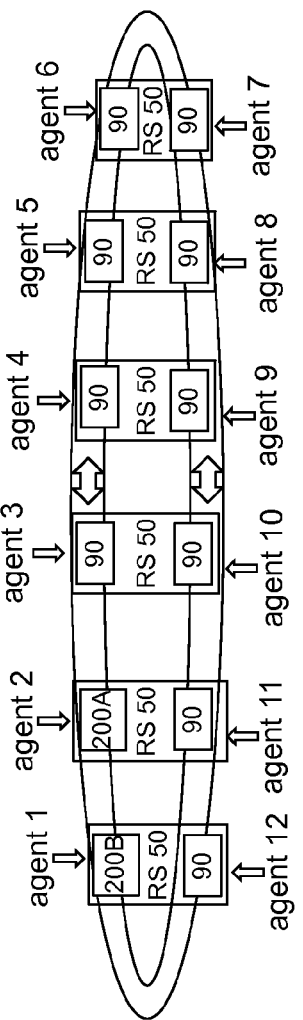
Figure 6C:
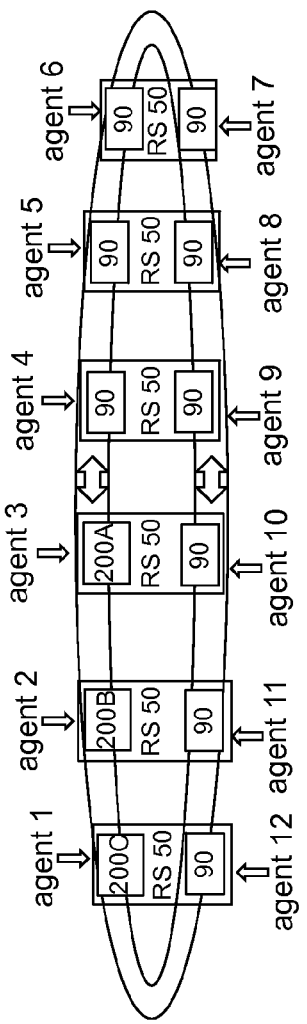

FIGS. 6A-6C each depict a single horizontal ring 30, along with twelve agents 98, according to some embodiments. The principles described herein with respect to the horizontal ring 30 similarly apply to the vertical ring 40. The horizontal ring 30 includes twelve ring slots 90, one for each agent 98. The ring slots 90 are the means by which each agent 98 transmits messages to other agents in the interconnect. Thus, where reference is made to messages being transmitted between agents 98 on the interconnect 150, it is to be understood that the messages are, in practice, transmitted in the form of flits 200. In FIGS. 6A-6C, three different flits are depicted, 200A, 200B, and 200C (collectively, "flits 200").

Suppose that the first agent, agent 1, inserts a flit 200 into its respective ring slot 90, as illustrated in FIG. 6A. In the next time period (FIG. 6B), the flit 200A has moved over one position, into the ring slot 90 associated with agent 2. This prevents agent 2 from inserting a flit 200 into the ring 30. Nevertheless, agent 1 is able to insert a second flit 200B into the ring 30. In the next time period (FIG. 6C), the flit 200A has moved again, this time into the ring slot 90 associated with agent 3. The flit 200B has also moved into the ring slot 90 associated with agent 2. Both agent 2 and agent 3 are blocked from inserting flits 200 at this time. Meanwhile, agent 1 is able to insert a third flit 200C into the ring 30.

FIGS. 6A-6C illustrate how flits 200 move around the horizontal ring 30, and stop at each agent position (ring stop 90) during each time period. The horizontal ring 30 travels in a single direction, in this case, clockwise. The figures illustrate why the first (peripheral) agent is favored over succeeding (middle) agents connected to the ring 30. When the first agent 98, agent 1, inserts the flit 200 in its respective ring slot 90, then, in the next time period, the second agent, agent 2, is prevented from submitting its own flit 200 to the ring 30. Because agent 1 is at the periphery of the interconnect 150, or the "head of the line", agent 1 is favored over other agents on the horizontal ring 30, and will thus be able to deliver more messages to the interconnect 150 in a timely manner.

Since the horizontal ring 30 is actually two half-rings, the flits 200 do not travel past the agent 6 ring slot 90, but will move to the vertical ring 40 by way of the appropriate ring stop 50. The principles illustrated in FIGS. 6A-6C for agent 1 may similarly apply to agent 7, since agent 7 is the peripheral agent of its respective half-ring. Agent 7, in a first time period, sends the flit 200 in a clockwise direction, is received in its ring slot 90. In a second time period, the flit 200 travels to the ring slot 90 for agent 8, preventing agent 8 from inserting its own flit. Thus, as with agent 1, because of the configuration of the interconnect 150, agent 7 is favored over agents 8, 9, and so on.

Returning to FIG. 2, in order for a flit 200 to be received by the intended agent 98, there are three steps, in some embodiments. First, the flit 200 enters the interconnect 150 on the horizontal ring 30 that is in the same row as the transmitting agent 98. The flit 200 travels across the ring, ring stop 50 by ring stop, until reaching the column where the receiving agent 98 is located. Next, the flit 200 enters a ring stop 50 that is disposed between the horizontal ring 30 and a vertical ring 40, where the ring stop occupies the same column as the receiving agent 98. At this point, the flit 200 leaves the horizontal ring 30 and enters the vertical ring 40. Again, the flit 200 travels, ring stop 50 by ring stop, along the vertical ring 40 until reaching the location of the receiving agent 98. At that point, the flit 200 is received by the receiving agent 98.

Thus, for example, if the transmitting agent 98 is in the first row, first column and the receiving agent is in the third row, third column, the flit 200 will enter the interconnect 150 into a ring slot 90 at the first ring stop 50 of the horizontal ring 30, stop at the second ring stop (second agent), and stop at the third ring stop (third agent) before entering the ring stop 50 to transfer to the vertical ring 40. On the vertical ring, the flit 200, starting at the ring stop in the first row, will stop at the ring stop in the second row, and stop at the ring stop in the third row, where the receiving agent is located. The number of stops in the vertical direction depends on finding the shortest path to the intended destination.

Figure 7:
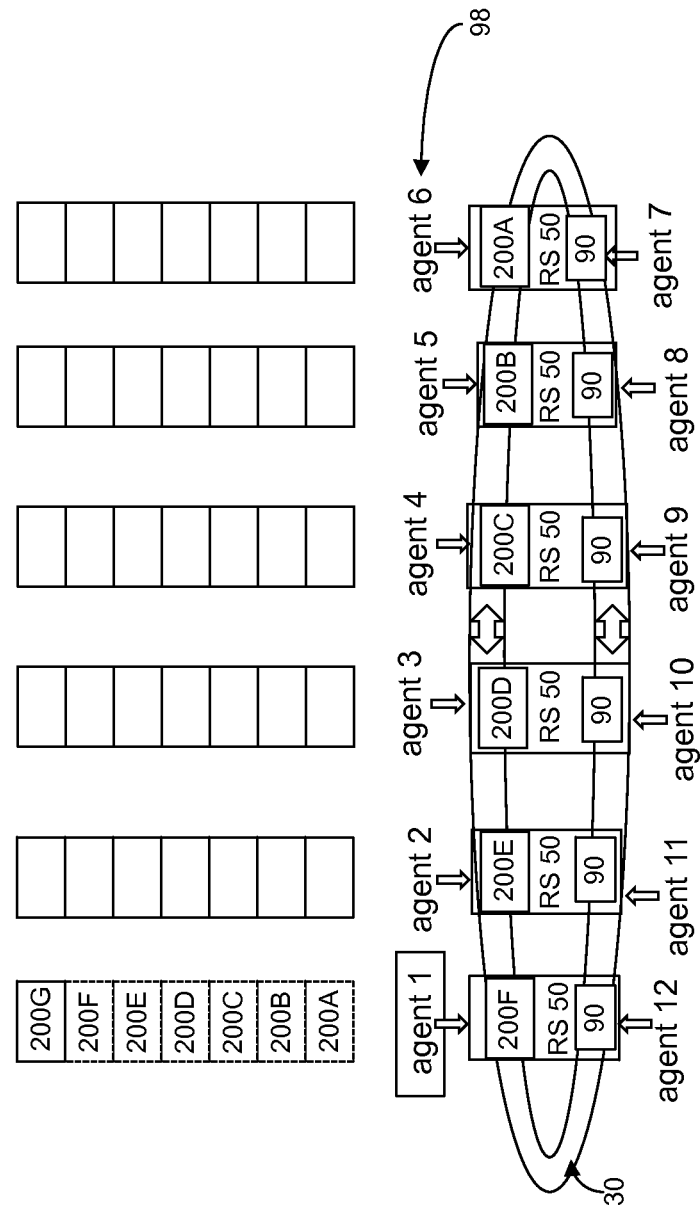
FIG. 7 is a simplified diagram of several agents having queues for storing message flits, to illustrate the head-of-line blocking phenomenon, according to some embodiments.

FIG. 7 illustrates another phenomenon about the interconnect 150, according to some embodiments, known as head-of-line blocking. Recall that each agent 98 in the interconnect 150 has a buffer or queue 96 (such as in core box 52 or cache box 54) for storing the flits 200 (FIG. 5). Because the message to be transmitted is made up of multiple flits 200, the flits are to be transmitted in a predetermined order. When the first flit 200 in the buffer 96 is blocked from being able to access the ring slots 90 of the horizontal ring 30, the egress buffer 96 being blocked becomes full, preventing new messages from entering the ring.

In FIG. 7, suppose agent 1 is sending a message to agent 7. Agent 1 has a buffer 96 full of flits 200A-200G that, together, comprise the message. Agent 1 is able to inject a flit 200 at every time period, with six flits 200 shown in FIG. 7. (Within the ring stop 50 for agent 6, the flits 200 are transferred directly to agent 7.) Because of the flits already being present in their respective ring slots 90, agents 2-6 are unable to find an empty slot 90 in which to deliver flits in the horizontal direction. Thus, agents 2-6 suffer from head-of-line blocking.

As illustrated in FIG. 5, the transgress buffer 66 also has buffers or queues 96. The head-of-line blocking phenomenon can also be found at the queue of the transgress buffer 66 that injects packets into the vertical ring 40. The contention produced by the head-of-line blocking propagates the congestion at the horizontal ring 30, since the ring is not able to drain packets that are intended for the vertical ring. This, in turn, results in an increase of messages bouncing at the horizontal ring.

In some embodiments, the slot reservation method 100 avoids the head-of-line blocking at the injection queues or buffers 96 that reside in the core box 52, the cache box 54, and the transgress buffer 66 caused by the unavailability of empty slots at the destination ring. Another phenomenon that reduces efficient processing of messages in the interconnect 150 is known as bounce. Bounce may occur under different circumstances.

For example, bounce happens when the flit 200 is unable to leave the horizontal ring 30, due to the unavailability of the transgress buffer 66. Bounce may also happen when the flit 200 is unable to leave the vertical ring 40, due to the unavailability of the agent 98 to receive the flit. In these instances, the flit 200 will continue to travel along the ring slots 90, which may decrease the throughput of other messaging operations. Avoiding both head-of-line blocking and bounce are thus desirable for improving the throughput of the interconnect 150. As used herein, bounce refers to a flit remaining on a ring of the interconnect 150 because the flit is unable to leave the ring. Although bounce may occur on the vertical ring 40, bounce on the horizontal ring 30 is addressed by the slot reservation method 100, in some embodiments. The principles described herein with respect to the horizontal ring 30 may, in other embodiments, be applied to the vertical ring 40.

The head-of-line blocking and the effect of message bounce both makes it difficult to drain new messages into their intended destination, which, in turn, causes a contention of packets that propagates along different buffers or queues 96 within the interconnect 150. For example, where the agent 98 is unable to process flits 200, the ingress queue or buffer 96 to the agent 72 or 74 may become full. Such contention causes starvation of certain agents that are denied the possibility to inject new messages into (or eject new messages from) the interconnect 150. Where the agent is denied the capacity to inject messages into the interconnect 150 for more than a predetermined number of cycles, denied until its queue 96 is full, or denied until the queue reaches a threshold capacity, the result is severe performance degradation and interconnect latency unpredictability, in some embodiments. As used herein, starvation is a condition in which one or more agents disposed on a ring of the interconnect 150 are unable to inject a flit onto the ring. Starvation may occur in either the horizontal ring 30 or in the vertical ring 40.

Another aspect of the interconnect 150 is that the ring slots 90 of the vertical rings are divided into two polarities, with the core agents using one polarity and the cache agents using the other. Returning to FIG. 5, the core box 52 and the cache box 54 are connected to both parts (top and bottom) of the horizontal ring 30 by way of the multiplexers 56. Because of this configuration, agents 98 can send flits 200 in one of two directions on the horizontal ring 30, enabling the flits to be transmitted to their intended agent in the more efficient direction.

For the core box 72 and the cache box 74, the connections are a little different. The multiplexers 86 selectively connect the core box 72 and the cache box 74 to either the left side or the right side of the vertical ring 30. Because of this configuration, succeeding flits 200 that make up a single message are received by the core box 72 (or cache box 74) in every other time period.

In some embodiments, the slot reservation method 100 relies on a slot reservation mechanism to reserve a ring slot 90 in the direction to where it has been requested. In some embodiments, the optimization is possible because the reserved slot can be used to transport flits 200 in a direction opposite to their original transport direction. The ring slot reservation strategy is tailored to minimize empty reserved slots on the interconnect 150.

Figure 8:
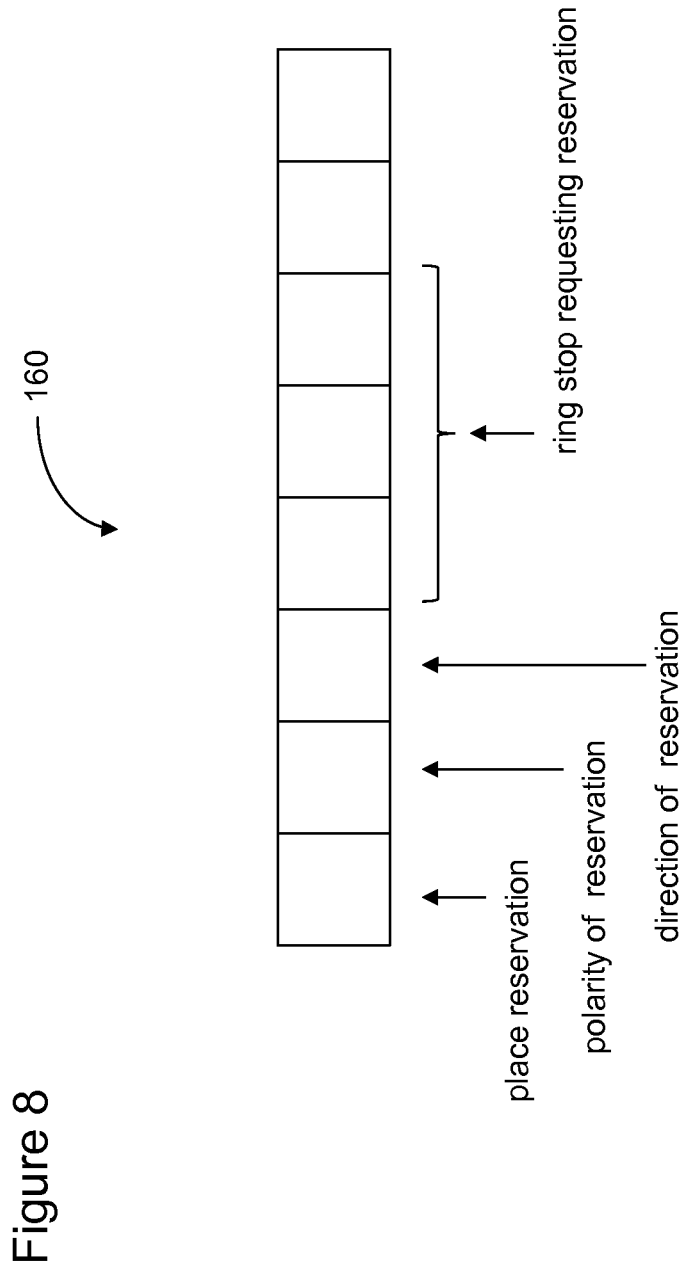
FIG. 8 is a register for making slot reservation requests, used by the slot reservation method of FIG. 1, according to some embodiments.

In some embodiments, every ring slot 90 uses a register to place a reservation, the direction requested by the reservation, and the ring stop 50 requesting the ring slot. FIG. 8 is a simplified block diagram of an eight-field register 160 used by the ring slot 50 to place a slot reservation, according to some embodiments. One field is used for placing the reservation, a second field is used to define the polarity of the reservation, a third field is used to define the direction of the reservation, and three fields enable the ring stop 50 requesting the reservation to be designated. In some embodiments, each field is represented by a single bit. For a horizontal ring 30 (or vertical ring 40) having six ring stops 50, three bits is sufficient to identify the particular ring stop making the reservation. However, for larger interconnects, the register 160 may need to utilize more bits to designate the ring stop 50.

In some embodiments, every ring stop 50 is in charge of clearing and issuing slot reservations. While traveling across the interconnect 150, the reserved slot restricts other ring stops 90, preventing them from injecting any flits 200 in the direction specified by the register 160. The slot reservation does not prevent other ring stops 50 from injecting flits 200 in the opposite direction, however. When the reserved ring slot 90 arrives at the ring stop 50 that placed the slot reservation, the ring stop first ensures that the reservation is cleared, and subsequently uses the ring slot 90 in which the reservation resides.

Figure 9:
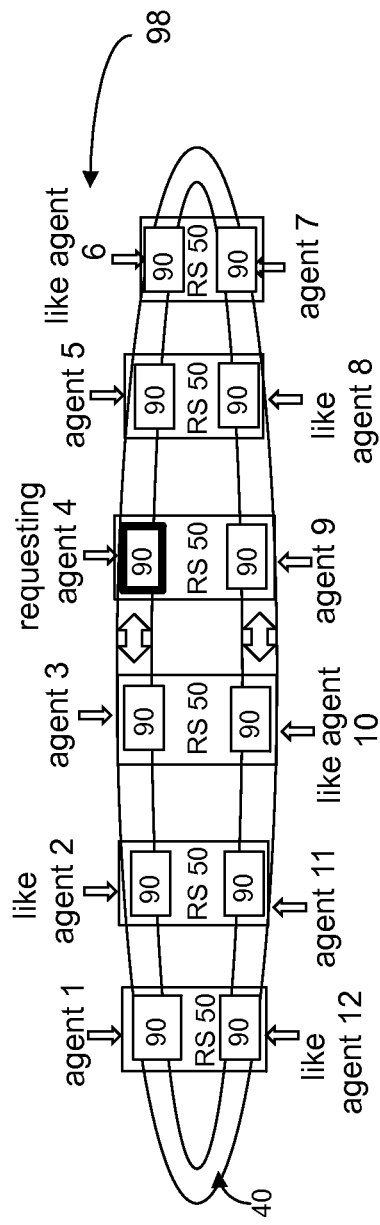
FIG. 9 is a simplified diagram illustrating how requesting agents generate slot reservations in the interconnect of FIG. 2, according to some embodiments.

FIG. 9 is a simplified diagram used to illustrate how the slot reservation mechanism operates, in some embodiments. The ring in FIG. 9 is a vertical ring 40. Suppose the fourth agent 98, denoted "requesting agent 4", decides to reserve a slot. Recall that there is a ring stop 50 dedicated to each agent and disposed between the horizontal 30 and vertical 40 rings of the interconnect 150. When required to place a reservation to one of the rings, the requesting agent 98 will notify its horizontal 60 or vertical 70 ring stop and request a slot reservation 180. The slot reservation 180 will be issued, but the requesting agent 98 will have to wait until the ring slot 90 holding the slot reservation 180 reaches the requesting agent.

Until the ring slot 90 holding the slot reservation returns to the requesting agent, other like agents are prevented from using the ring slot. As used herein, a "like agent" is defined as an agent having the same polarity as the requesting agent. Thus, "like agents" for requesting agent 4 are agents 6, 8, 10, 12, and 2. While these like agents might be prevented from using the ring slot 90 holding the slot reservation 180, in some embodiments, the remaining agents (agents 5, 7, 9, 11, 1, and 3), with their respective ring slots, are still able to use the ring slot 90. Thus, while agents 6, 8, 10, 12, and 2 will see the reserved slot 180 before the reserved slot returns to the requesting agent 4, only agent 6 is not able to access the slot, due to having the same direction as the requesting agent (clockwise). However, agents 8, 10, and 12 will also see the reserved slot before the requesting agent 4, and are able to use the ring slot 90. Agents 8, 10, and 12 can still use the slot 90 having the slot reservation 180 to deliver flits in the counter-clockwise direction, but agent 2 cannot use the slot to deliver a flit 200 in the clockwise direction.

In some embodiments, the slot reservation method 100 is implemented in software. In other embodiments, the method 100 is implemented in hardware. In still other embodiments, the method 100 is implemented using a combination of hardware and software elements.

In some embodiments, the slot reservation method 100 issues a slot reservation when a particular queue or buffer 96 is declared starved. Recall that each agent or transgress buffer stores flits in a queue or buffer 96 so that the flits enter the interconnect 150 in a predetermined order. In some embodiments, every queue 96 (whether in core box 52, cache box 54, transgress buffer 66A or transgress buffer 66B) that injects flits into the interconnect 150 has an associated counter. The counter is incremented every time the flit on top of the queue 96 fails to obtain a ring slot 90 on the horizontal ring 30 or the vertical ring 40 (in the latter case, at the correct polarity). When the counter reaches a configurable threshold, the queue 96 is declared starved. Accordingly, the associated ring stop 50 issues a slot reservation request. Once the slot has been reserved, the counter is reset and starts accounting again.

In some embodiments, when a flit 200 traveling across the horizontal 30 (or vertical 40) ring cannot be consumed at the destination, the flit is bounced across the ring. Bounces are produced for two main reasons. First, a bounce occurs when two flits 200 traveling on the horizontal ring from different directions arrive at the same ring stop 50. If both flits 200 are destined to the same queue (e.g., 96C) of the transgress buffer 66 (i.e. 66A), the ring stop 50 is able to accept one flit 200, but rejects the other flit, with the result being that the second flit continues bouncing through the horizontal ring 30. Second, a bounce occurs when the destination queue 96C or 96B of transgress buffer 66A or 66B is full, preventing storage of the flit 200 in the transgress buffer 66. The first situation is unlikely to happen at the vertical ring and can be tolerated up to certain point, but the second one may causes a chain reaction that can consume considerable bandwidth of the ring 30 if not controlled in a timely manner.

In FIG. 5, the slot reservation method 100 is disposed in both the horizontal ring stop 60 and in the vertical ring stop 70. In some embodiments, the slot reservation method 100 is performed in the horizontal ring stop 60 to address starvation in the horizontal ring 30 (A) while the method is performed in the vertical ring stop 70 to address starvation in the vertical ring 40 (B) and bounce in the horizontal ring 30 (C).

Figure 10:
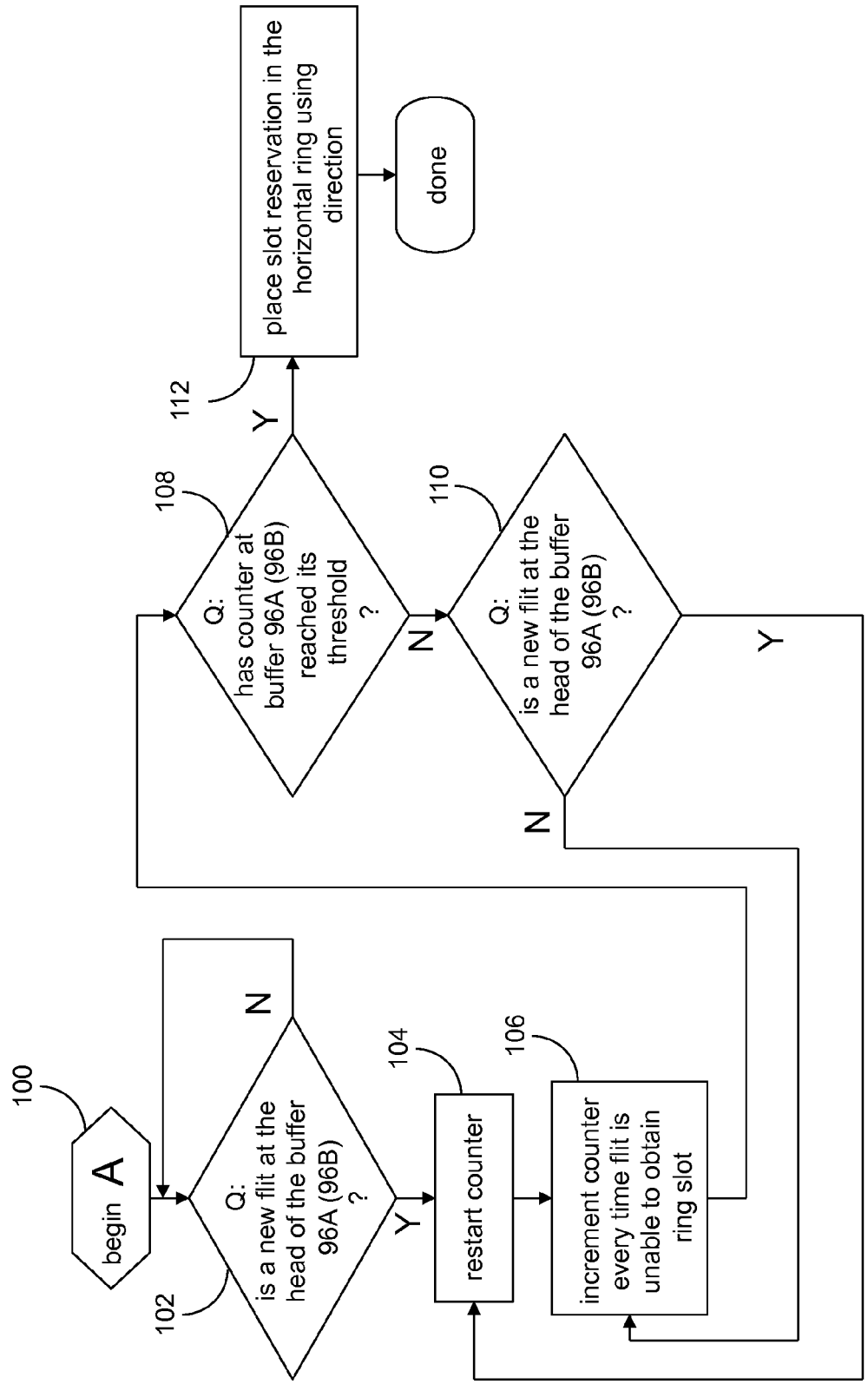
FIG. 10 is a flow diagram depicting operations of the slot reservation method of FIG. 1 to avoid starvation in the horizontal ring of an interconnect, according to some embodiments.
Figure 11:
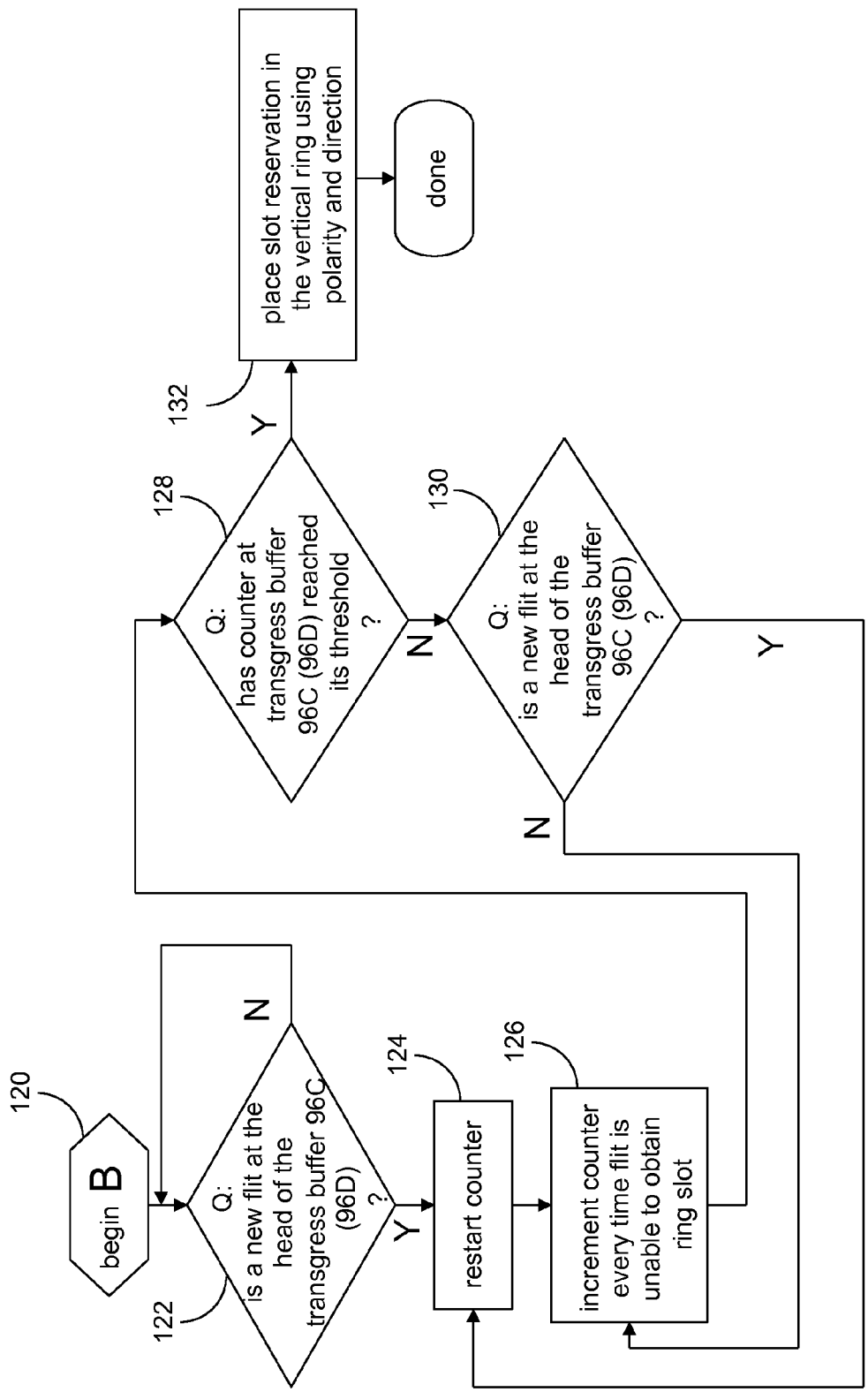
FIG. 11 is a flow diagram depicting operations of the slot reservation method of FIG. 1 to avoid starvation in the vertical ring of an interconnect, according to some embodiments.
Figure 12:
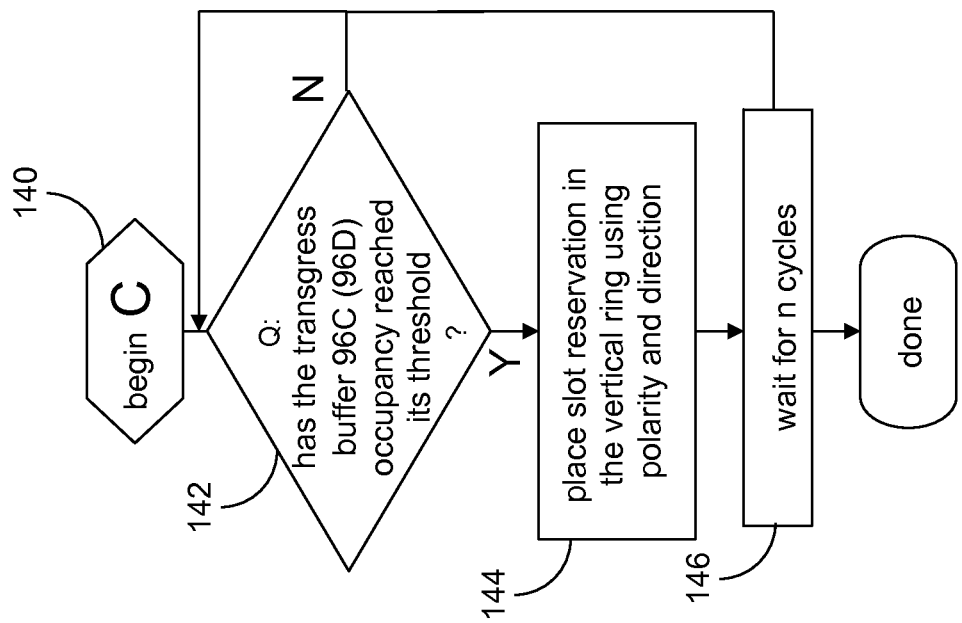
FIG. 12 is a flow diagram depicting operations of the slot reservation method of FIG. 1 to reduce bounce in the horizontal ring.

FIGS. 10-12 are flow diagrams showing how the slot reservation method 100 operates under the three conditions, A, B, and C, respectively, according to some embodiments. The first condition (A) is addressed by monitoring the buffers 96A (96B) in the core and cache boxes 52, 54 while the second condition (B) and third condition (C) are addressed by monitoring the buffers 96C (96D) in the transgress buffer 66.

The slot reservation method 100 addresses conditions A and B similarly, with the buffers feeding into the respective rings being monitored. A counter keeps track of each time a flit 200 is unable to obtain a ring slot 90, whether entering the horizontal ring 30 (A) or the vertical ring 40 (B). Once the counter reaches a threshold (time threshold), a slot is reserved, in the horizontal ring 30 (condition A) and in the vertical ring 40 (condition B). For condition C, the occupancy or fullness of the transgress buffers 96C (96D) are monitored. Once the buffers become full past a desired threshold (occupancy threshold), the slot reservation method 100 is invoked, causing a slot to be reserved in the vertical ring.

FIG. 10 addresses condition A, the possibility of starvation occurring on the horizontal ring 30, in some embodiments. First, where a new flit 200 is found at the head of the buffer 96A (96B) for the core box 52 (cache box 54) (block 102), a counter is restarted (block 104). The counter is to be incremented at each time period in which the flit 200 is unable to get onto the horizontal ring 30 and occupy a ring slot 90 (block 106). The counter thus helps to determine whether the flit 200 has entered the horizontal ring 30 within a reasonable time period (as specified by the time threshold).

Once the counter reaches the time threshold, however (block 108), a slot is reserved in the horizontal ring 30 (block 112). Recall from FIG. 8 that, in some embodiments, the register 160 may be used to obtain the slot reservation, with three bits indicating which ring stop 50 requested the reservation. Direction indication is made setting the appropriate direction bit which can either be clockwise or counter-clockwise. No polarity indication is needed in this case because the slot reservation is being made in the horizontal ring 30.

Where, instead, the counter has not reached the time threshold (the "no" prong of block 108), the slot reservation method 100 checks whether a new flit is at the head of the buffer 96A (96B) (block 110). If not, the counter is incremented (block 106) and the threshold query is made again (block 108). Otherwise, the counter is reset to zero (block 104) and the process is restarted when a new flit 200 is received into the buffer 96A (96B).

FIG. 11 addresses condition B, the possibility of starvation occurring on the vertical ring 40, in some embodiments. This time, the transgress buffers 96C (96D) are monitored. Where a new flit 200 is found at the head of the buffer 96C (96D) (block 122), a counter is restarted (block 124). The counter is to be incremented at each time period in which the flit 200 is unable to get onto the vertical ring 40 and occupy a ring slot 90 (block 126). The counter thus helps to determine whether the flit 200 has entered the vertical ring 40 within a reasonable time period (as specified by the time threshold).

Once the counter reaches the time threshold, however (block 128), a slot is reserved in the vertical ring 40 (block 132). Again, the register 160 may be used to obtain the slot reservation, with three bits indicating which ring stop 50 requested the reservation and one bit indicating the direction of the reservation. Since the vertical ring 40 includes polarity, the polarity indication in the register 160 is also provided when making the slot reservation.

Where, instead, the counter has not reached the time threshold (the "no" prong of block 128), the slot reservation method 100 checks whether a new flit is at the head of the buffer 96C (96D) (block 130). If not, the counter is incremented (block 126) and the threshold query is made again (block 128). Otherwise, the counter is reset to zero (block 124) and the process is restarted when a new flit 200 is received into the buffer 96C (96D).

FIG. 12 addresses condition C, the possibility of bounce on the horizontal ring 30, in some embodiments. Again, the transgress buffer 96C (96D) is being monitored. This time, however, the slot reservation method 100 monitors how full the buffer is rather than how efficiently the flit at the top of the buffer get processed.

Once the transgress buffer 96C (96D) gets full, flits 200 on the horizontal ring 30 will be prevented from leaving the horizontal ring and will thus have no choice but to bounce around the ring, driving down the throughput of message processing. Thus, the slot reservation method 100 continuously checks to see whether the transgress buffer 96C (96D) exceeds a predetermined threshold (occupancy threshold) (block 142). If so, the slot reservation is placed in the vertical ring 40, with the register 160 indicating the ring stop, the polarity, and the direction (block 144). Once the reservation has been placed, the slot reservation method 100 waits for a configurable number of cycles before continuing with the operation (block 146). In some embodiments, the wait is done in order to prevent flooding of the vertical ring with reservations in case the transgress buffer is constantly over the occupancy threshold.

The slot reservation method 100 relies on a configurable threshold that detects a high occupancy of the transgress buffer queues as well as the egress queue of agents, and responds by triggering a slot reservation (at the appropriate polarity) on the destination ring.

In some embodiments, the anti-starvation mechanism of the slot reservation method 100 takes control of the maximum interconnect latency and alleviates the unfairness produced by the intrinsic injection priorities and the natural behavior of the ring 30 (40).

In some embodiments, the bounce-reduction mechanism of the slot reservation method 100 ensures control of the maximum interconnect latency while provides a fair bandwidth utilization of the vertical resources by making sure that tributary queues of the ring 30 (40) are efficiently drained when they are about to become full. Other strategies can be implemented to provide bandwidth guarantees with quality of service purposes. The slot reservation mechanism of the slot reservation method 100 is tailored to minimize empty reserved slots, by placing reservations only in the direction where it has been requested.

The squares in FIG. 5 denoting the slot reservation method 100 employ anti-starvation and bounce reduction in the vertical ring 40, but only anti-starvation in the horizontal ring 30. Bounces are expected to occur mostly in the horizontal ring 30, in some embodiments.

Figure 13:
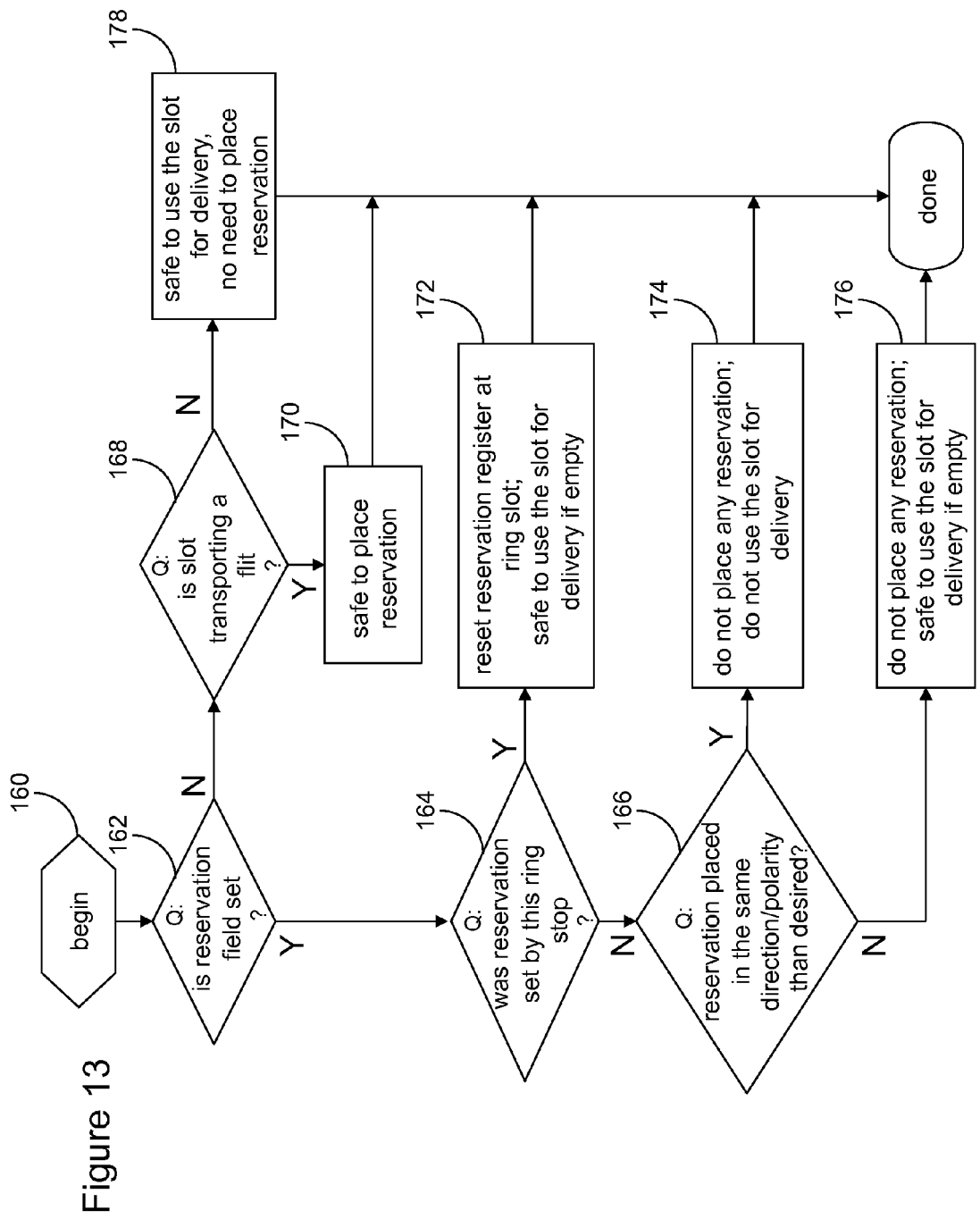
FIG. 13 is a flow diagram depicting operations performed by the slot reservation method of FIG. 1 upon arrival of the ring slot to the ring stop, according to some embodiments.

FIG. 13 is a flow diagram showing a procedure 160 followed by the slot reservation method 100 upon arrival of the ring slot 90 to the ring stop 50, according to some embodiments. This procedure 160 is used to place the reservation and to determine if it is safe to use the current slot when there is a reservation in place.

As part of the slot reservation method 100, the ring stop 50 inspects the information from the reservation register 160 as well as the occupancy of the ring slot 90. If a reservation field is set (block 162) and a reservation has been previously made by the current ring stop 50 (block 164), the ring stop resets the reservation field 160 at the ring slot 90, and the ring slot is safe to use for delivery if empty (block 172). If the reservation field is not set (the "no" prong of block 162), then, if the ring slot 90 is not transporting a flit 200 (block 168), then the ring slot is available to use for delivery of a flit by the ring stop 50, such that the ring stop 50 needn't place a reservation (block 178). However, if the ring slot 90 is currently transporting a flit 200 (the "yes" prong of block 168), then the ring stop 50 may place a reservation (block 170).

Where the reservation field is set (the "yes" prong of block 162), the ring stop 50 checks whether it "owns" the reservation, that is, whether the reservation was placed by the current ring stop (block 164). If so, the ring stop 50 resets the reservation register at the ring slot 90, making it safe for the ring stop to use the slot to deliver a flit 200 if empty (block 172). Where the ring stop 50 does not "own" the reservation (the "no" prong of block 164), the ring stop determines whether the current reservation is in the same direction/polarity as desired (block 166). In other words, does the current ring stop 50 want to send a flit 200 in the same direction/polarity as the slot reservation is traveling? If so (the "yes" prong of block 166), the ring slot 50 is unable to place a reservation and does not use the slot 90 for delivery of a flit 200 (block 174). Otherwise, the current reservation is traveling in a different direction/polarity than the ring stop desires to transmit a flit 200. So, while the ring stop 50 is unable to place a reservation, the ring stop is able to use the ring slot 90 to deliver a flit 200 (block 176). For the current ring stop 90, the analysis is complete, and is repeated in the next succeeding ring slot 50 at the next processing cycle.

Based on technology advancement trend, processors with several tens to hundreds of cores and other IP blocks integrated on a single die will be widely available for cloud computing market. The slot reservation method 100 is expected to be a strong candidate as the scalable solution for on-die communication, in some embodiments.

The slot reservation method 100 is able to guarantee fairness and latency predictability for messages, allowing designers to guarantee a fair amount of resources for every agent within the interconnect 150, and to provide quality of service based on providing the maximum performance with latency predictability.

The interconnect 150 of FIG. 2 is designed to inject flits 200 in the horizontal dimension first and, if required, move them into the vertical dimension using the transgress buffer 66. In another possible implementation, the flits 200 could get injected first through the vertical dimension and, if required, moved into the horizontal dimension using the transgress buffer.

While the application has been described with respect to a limited number of embodiments, those skilled in the art will appreciate numerous modifications and variations therefrom. It is intended that the appended claims cover all such modifications and variations as fall within the true spirit and scope of the invention.

I claim:

1. An apparatus comprising:
a plurality of agents disposed on an interconnect, the interconnect comprising at least one horizontal ring and at least one vertical ring, the agents to communicate using flits, wherein flits, short for flow control digits, are the smallest unit of flow control on the interconnect;
a buffer to store a plurality of flits on behalf of a first agent, the plurality of flits to be transmitted to a second agent on the interconnect;
a plurality of ring slots disposed upon both the horizontal ring and the vertical ring, where a ring slot is associated with each agent of the plurality of agents;
a software program to place a slot reservation in one of the rings in response to a counter reaching a threshold value, the software program to further set n bits in a register with a value corresponding to the first agent, where integer, n, corresponds to 2n agents located on the interconnect;
a horizontal ring stop to process flits received from the agent intended for the second agent on the interconnect; and
a vertical ring stop to process flits received from the horizontal ring, wherein flits processed by the vertical ring stop are sent to the second agent by way of the vertical ring.

2. The apparatus of claim 1, the software program further to:
increment the counter every time a flit is unable to obtain a ring slot, wherein one of the plurality of ring slots for depositing the flit onto the ring is available to the first agent in each succeeding time period.

3. The apparatus of claim 2, wherein the slot reservation is placed in the horizontal ring in a direction such that starvation in the horizontal ring is avoided.

4. The apparatus of claim 2, wherein the buffer is a transgress buffer between a vertical ring stop and a horizontal ring stop and the slot reservation is placed in the vertical ring in a direction and a polarity such that starvation in the vertical ring is avoided.

5. The apparatus of claim 1, further comprising:
a transgress buffer disposed between the horizontal ring stop and the vertical ring stop, the transgress buffer to temporarilily store flits passing from the horizontal ring to the vertical ring.

6. The apparatus of claim 5, wherein the software program places a slot reservation in the vertical ring in response to the transgress buffer reaching an occupancy threshold.

7. The apparatus of claim 1, the software program further to:
indicate a direction for the slot reservation; and
indicate the first agent requesting the slot reservation.

8. An communication apparatus comprising at least one processor, the at least one processor comprising a plurality of cores, the communication apparatus comprising:
a ring stop coupled to a horizontal ring and a vertical ring, the horizontal ring and the vertical ring being part of an interconnect having a plurality of horizontal and vertical rings;
a software program to insert a slot reservation on either the horizontal ring or the vertical ring on behalf of one of the cores;
a horizontal ring stop to process flits received from an agent and inserted on one of a plurality of horizontal ring slots disposed on the horizontal ring, wherein flits, short for flow control digits, are the smallest unit of flow control on the interconnect;
a transgress buffer to receive and store flits received from the horizontal ring;
a vertical ring stop to process flits received from the transgress buffer and inserted on one of a plurality of vertical ring slots disposed on the vertical ring;
wherein the horizontal ring stop further comprises:
a first multiplexer coupled between a core and the horizontal ring; and a second multiplexer coupled between the core and the horizontal ring;
wherein the first and second multiplexers deposit the flits onto the horizontal ring in either a clockwise direction or in a counter-clockwise direction;
wherein the software program mitigates starvation and bounce on the interconnect.

9. The communication apparatus of claim 8 , further comprising: a counter to be incremented by the software program every time a flit is unable to obtain a ring slot.

10. The communication apparatus of claim 9, further comprising: means to indicate a direction in which the slot reservation is to be placed.

11. The communication apparatus of claim 9, further comprising: means to indicate a polarity in which the slot reservation is to be placed.

12. The communication apparatus of claim 9, further comprising: means to indicate which core is requesting the slot reservation.

13. The communication apparatus of claim 8, wherein the horizontal ring is a combination of two half-rings and the vertical ring is a second combination of two half-rings.

14. A communication apparatus comprising at least one processor, the at least one processor comprising a plurality of cores, the communication apparatus comprising:
- a ring stop coupled to a horizontal ring and a vertical ring, the horizontal ring and the vertical ring being part of an interconnect having a plurality of horizontal and vertical rings; and
- a software program to insert a slot reservation on either the horizontal ring or the vertical ring on behalf of one of the cores;
- a register which, when set, invokes the slot reservation, the register comprising: n bits for integer n, to specify a core identifier, the core identifier to indicate which core is requesting the slot reservation, where the interconnect comprises 2n cores, each agent comprising a unique agent identifier;
- a direction bit to indicate which direction the slot reservation should travel; and
- a polarity bit to indicate which polarity the slot reservation should reserve, wherein the polarity bit is used for the vertical ring only wherein the software program mitigates starvation and bounce on the interconnect.

* * * * *